United States Patent
Zhang et al.

(10) Patent No.: US 9,313,064 B2
(45) Date of Patent: Apr. 12, 2016

(54) METHOD AND APPARATUS FOR SYNCHRONIZATION IN AN OFDMA EVOLVED UTRA WIRELESS COMMUNICATION SYSTEM

(75) Inventors: Guodong Zhang, Syosset, NY (US); Kyle Jung-Lin Pan, Saint James, NY (US); Allan Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1297 days.

(21) Appl. No.: 11/735,628

(22) Filed: Apr. 16, 2007

(65) Prior Publication Data
US 2008/0013516 A1  Jan. 17, 2008

Related U.S. Application Data

(60) Provisional application No. 60/792,774, filed on Apr. 18, 2006.

(51) Int. Cl.
*H04L 5/00* (2006.01)
*H04L 27/26* (2006.01)
*H04J 11/00* (2006.01)
(Continued)

(52) U.S. Cl.
CPC ......... *H04L 27/2613* (2013.01); *H04J 11/0069* (2013.01); *H04L 5/0007* (2013.01); *H04L 5/0048* (2013.01); *H04L 5/0016* (2013.01); *H04L 5/0023* (2013.01); *H04L 27/2621* (2013.01); *H04L 27/2655* (2013.01); *H04W 56/00* (2013.01); *H04W 92/10* (2013.01)

(58) Field of Classification Search
CPC .............. H04L 5/0007; H04L 27/2613; H04L 27/2655; H04L 5/0064; H04L 27/2656; H04L 27/2662; H04L 27/2675; H04L 5/0053; H04L 27/2657; H04L 5/0048; H04L 5/005; H04J 11/0073; H04J 11/0076
See application file for complete search history.

(56) References Cited

U.S. PATENT DOCUMENTS 5,625,876 A * 4/1997 Gilhousen et al. ............ 370/331
6,804,311 B1 * 10/2004 Dabak et al. .................. 375/347
7,016,298 B2    3/2006 Akiyama et al.
(Continued)

FOREIGN PATENT DOCUMENTS

WO    WO 2005101882 A1 * 10/2005

OTHER PUBLICATIONS

NTT DoCoMo, NEC, Sharp, SCH Structure and Cell Search Method in E-UTRA Downlink, 3GPP TSG-RAN WG1 LTE Ad Hoc Meeting, Jan. 23-25, 2006 R1-060042.*
(Continued)

*Primary Examiner* — Matthew Sams
(74) *Attorney, Agent, or Firm* — Volpe and Koenig, P.C.

(57) ABSTRACT

A method and apparatus for synchronization in an orthogonal frequency division multiple access (OFDMA) evolved universal terrestrial radio access (E-UTRA) system including at least one base station and a plurality of wireless transmit/receive units (WTRUs). A secondary synchronization channel (S-SCH) symbol is generated to include cell-specific information. The S-SCH symbol is mapped to the center of the available bandwidth of the system. In one embodiment, the S-SCH symbol is transmitted on different subcarriers at different sectors in the system. In another embodiment, the S-SCH symbol is transmitted on the same subcarriers at different sectors in the system.

20 Claims, 7 Drawing Sheets

(51) Int. Cl.
*H04W 56/00* (2009.01)
*H04W 92/10* (2009.01)

(56) References Cited

U.S. PATENT DOCUMENTS

| | | | |
|---|---|---|---|
| 7,386,055 B2 * | 6/2008 | Morita et al. | 375/260 |
| 2002/0046382 A1 * | 4/2002 | Yang | 714/758 |
| 2004/0008616 A1 | 1/2004 | Jung et al. | |
| 2004/0085946 A1 | 5/2004 | Morita et al. | |
| 2004/0146003 A1 | 7/2004 | Schaefer et al. | |
| 2004/0246998 A1 | 12/2004 | Ma et al. | |
| 2005/0063298 A1 | 3/2005 | Ling et al. | |
| 2005/0088996 A1 * | 4/2005 | Kawamura et al. | 370/335 |
| 2005/0099939 A1 | 5/2005 | Huh et al. | |
| 2006/0050799 A1 | 3/2006 | Hou et al. | |
| 2007/0076668 A1 * | 4/2007 | Tirkkonen et al. | 370/335 |
| 2007/0116094 A1 * | 5/2007 | Parts et al. | 375/130 |
| 2007/0140106 A1 * | 6/2007 | Tsai et al. | 370/208 |
| 2007/0183386 A1 * | 8/2007 | Muharemovic et al. | 370/344 |
| 2007/0183391 A1 * | 8/2007 | Akita et al. | 370/350 |
| 2007/0202902 A1 * | 8/2007 | Jansen et al. | 455/502 |
| 2007/0249361 A1 * | 10/2007 | Klang et al. | 455/452.2 |
| 2009/0323642 A1 * | 12/2009 | Tanno et al. | 370/336 |

OTHER PUBLICATIONS

3GPP, *3rd Generation Partnership Project; Technical Specification Group Radio Access Network; Physical Layer Aspects for Evolved UTRA (Release 7)*, 3GPP TR 25.814 V0.1.1, (Jun. 2005).

Ericsson et al., *Text Proposal on Cell Search in Evolved UTRA*, TSG-RAN WG1 #43, R1-051308, (Seoul, Korea Nov. 7-11, 2005).

Third Generation Partnership Project, "Technical Specification Group Radio Access Network; Physical Channels and Modulation (Release 8)," 3GPP TS 36.211 V1.0.0 (Mar. 2007).

Third Generation Partnership Project, "Technical Specification Group Radio Access Network; Multiplexing and channel coding (Release 8)," 3GPP TS 36.212 V1.0.0 (Mar. 2007).

Third Generation Partnership Project, "Technical Specification Group Radio Access Network; Physical layer procedures (Release 8)," 3GPP TS 36.213 V1.0.0 (Mar. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.0.0 (Mar. 2007).

* cited by examiner

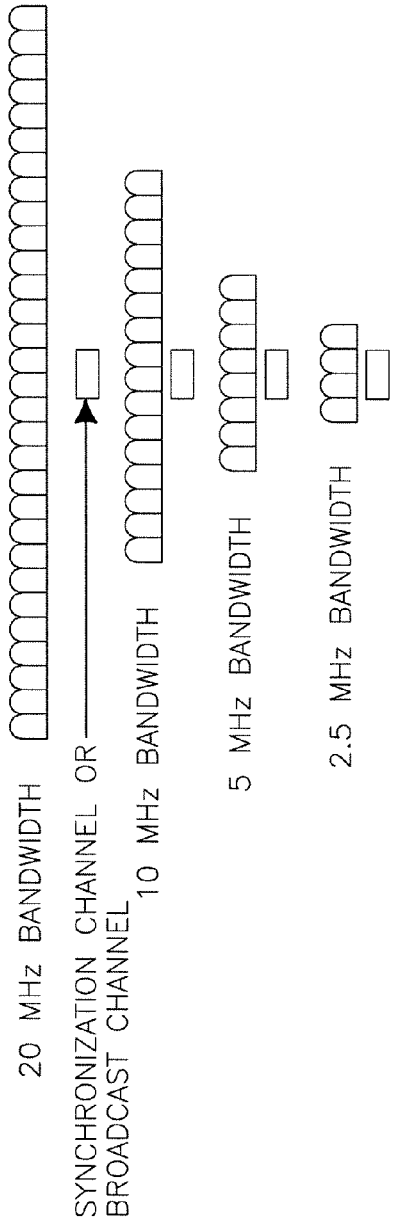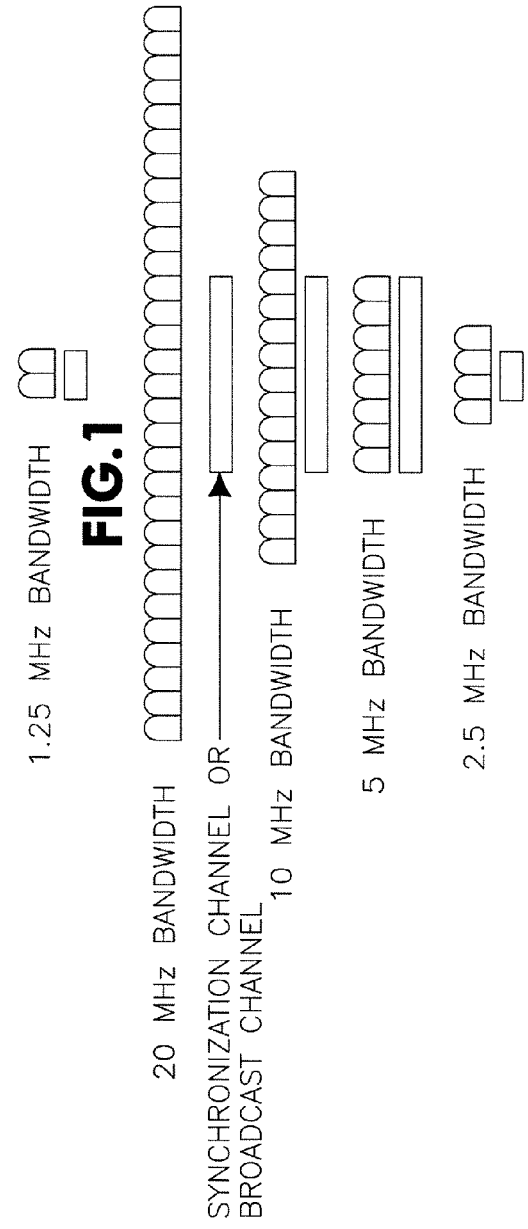

METHOD AND APPARATUS FOR SYNCHRONIZATION IN AN OFDMA EVOLVED UTRA WIRELESS COMMUNICATION SYSTEM

CROSS REFERENCE TO RELATED APPLICATION

This application claims the benefit of U.S. Provisional Application No. 60/792,774, filed Apr. 18, 2006, which is incorporated herein by reference as if fully set forth.

FIELD OF INVENTION

The present invention is related to synchronization in wireless communication systems. More particularly, the present invention is related to a method and apparatus for synchronization in an orthogonal frequency division multiple access (OFDMA) evolved universal terrestrial radio access (E-UTRA) system.

BACKGROUND

Both the Third Generation Partnership Project (3GPP) and 3GPP2, in order to keep the technology competitive for a longer time period, are considering long term evolution. Accordingly, evolution of radio interfaces and network architecture is necessary to support this goal.

Currently, orthogonal frequency division multiple access (OFDMA) is being considered for the downlink of evolved universal terrestrial radio access (E-UTRA). In the current state of the art, when a user equipment (UE) powers on in the E-UTRA system having an OFDMA based downlink, it synchronizes frequency, downlink frame timing and the Fast Fourier Transform (FFT) symbol timing with the best cell. In addition, the UE identifies the cell ID. This collective process may be referred to as the "cell search."

The synchronization channel and cell search process for OFDMA-based downlink are currently being studied in E-UTRA. It would be desirable to define a synchronization channel that is a common for all cells in the system. In one regard, it has been determined that that downlink synchronization channel (SCH) is transmitted using 1.25 MHz or 5 MHz bandwidth regardless of the entire bandwidth of the system. In this way, the same SCH is mapped to the central part of transmission bandwidth.

Given the differences between universal mobile telecommunications system (UMTS) UTRA and evolved UTRA, it would be desirable to provide a new secondary SCH (S-SCH) for evolved UTRA.

SUMMARY

The present invention is related to a method and apparatus for synchronization in an OFDMA E-UTRA system including at least one base station and a plurality of wireless transmit/receive units (WTRUs). The method comprises configuring a secondary synchronization channel (S-SCH) symbol to include cell-specific information. The S-SCH is mapped to a central bandwidth of the system. In one embodiment, the S-SCH symbol is transmitted on different subcarriers at different sectors in the system. In another embodiment, the S-SCH symbol is transmitted on the same subcarriers at different sectors in the system

BRIEF DESCRIPTION OF THE DRAWINGS

A more detailed understanding of the invention may be had from the following description of a preferred embodiment, given by way of example and to be understood in conjunction with the accompanying drawings wherein:

FIG. 1 is a graphical representation of an SCH defined for 1.25 MHz;

FIG. 2 is a graphical representation of SCHs defined for 1.25 and 5 MHz;

DETAILED DESCRIPTION OF THE PREFERRED EMBODIMENT(S)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is directed to a method and apparatus for synchronization in an orthogonal frequency division multiple access (OFDMA) evolved universal terrestrial radio access (E-UTRA) system. A new secondary synchronization channel (S-SCH) is configured and utilized to perform synchronization. The S-SCH may achieve, among other things, a high cell search performance, a balanced peak to average power (PAPR) between the primary SCH (P-SCH) and the S-SCH, and a low computation complexity. The S-SCHs of different sectors may be multiplexed by, for example, frequency division multiplexing (FDM) or code division multiplexing (CDM).

FIG. 1 is a graphical representation of an SCH defined for 1.25 MHz. As shown in FIG. 1, the SCH is centered in the middle of the available bandwidth and is independent of the system bandwidth. FIG. 2 is a graphical representation of an SCH defined for 1.25 and 5 MHz. As shown in FIG. 2, the SCH is again centered in the middle of the available bandwidth and is independent of the system bandwidth.

Figure 3:
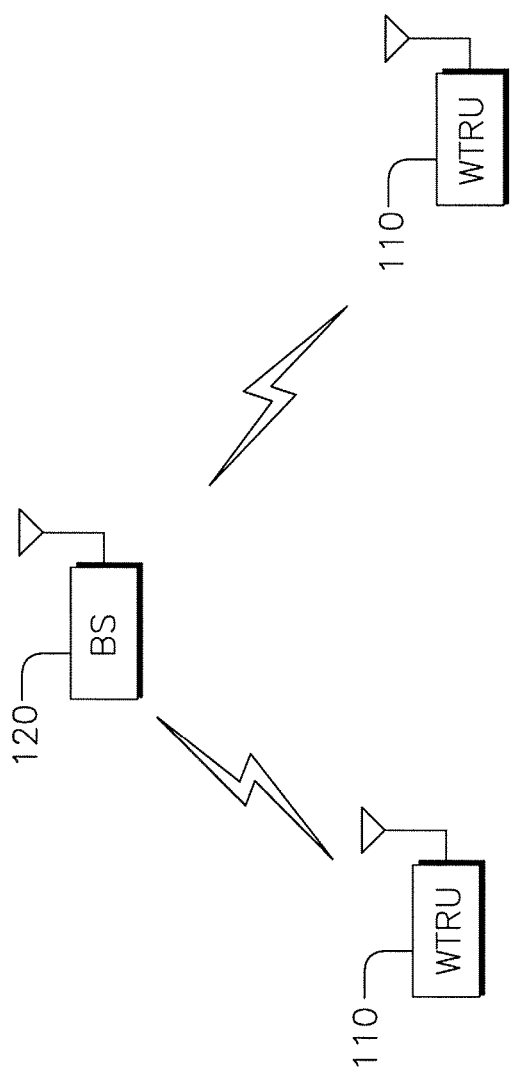
FIG. 3 shows an exemplary wireless communication system, including a base station (BS) and a plurality of wireless transmit/receive units (WTRUs), configured in accordance with the present invention.

FIG. 3 shows an exemplary wireless communication system 100, including a base station (BS) 120 and a plurality of wireless transmit/receive units (WTRUs) 110, capable of wirelessly communicating with one another. Although the wireless communication devices depicted in the wireless communication system 100 are shown as WTRUs and a base station, it should be understood that any combination of wireless devices may comprise the wireless communication system 100.

Figure 4:
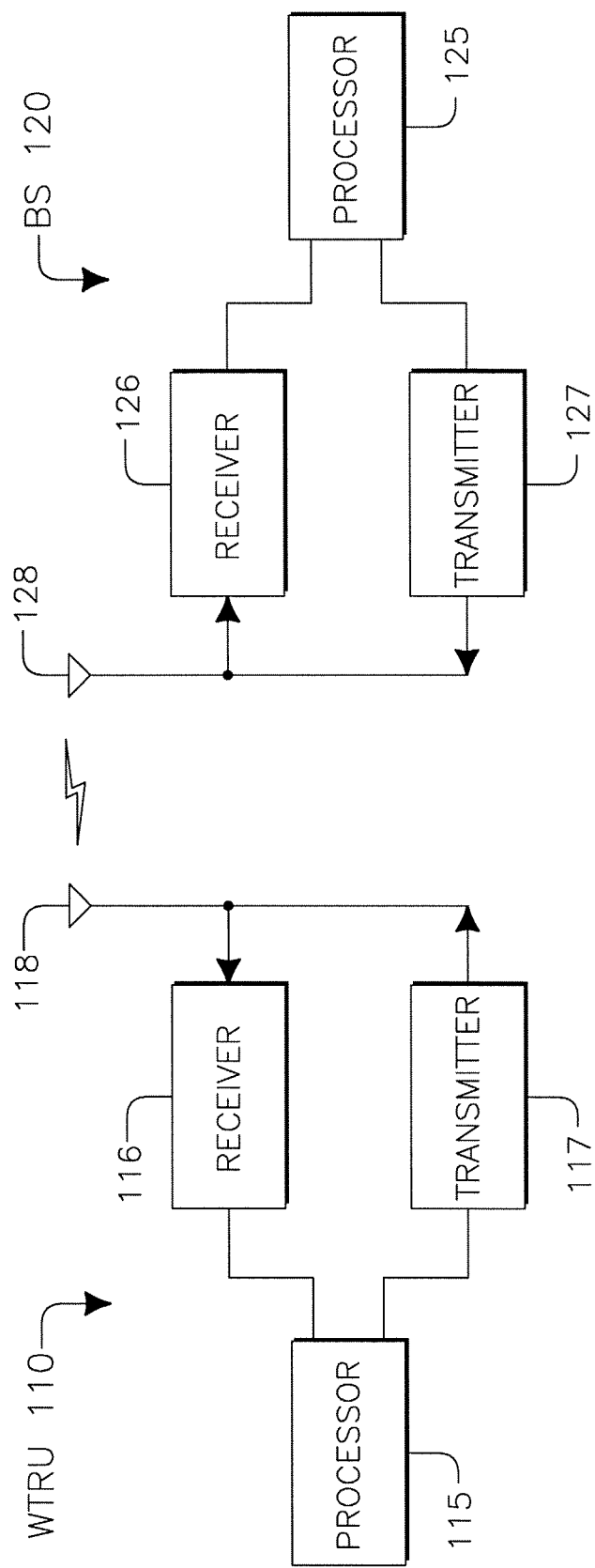
FIG. 4 is a functional block diagram of a WTRU and the BS of the wireless communication system of FIG. 3.

FIG. 4 is a functional block diagram of a WTRU 110 and the BS 120 of the wireless communication system 100 of FIG. 3. As shown in FIG. 4, the WTRU 110 and the BS 120 are in wireless communication with one another, and are configured to configure and utilize a secondary synchronization channel (S-SCH) in accordance with the present invention.

In addition to the components that may be found in a typical WTRU, the WTRU 110 includes a processor 115, a receiver 116, a transmitter 117, and an antenna 118. The processor 115 is configured to receive and process S-SCH symbols in accordance with the present invention. The receiver 116 and the transmitter 117 are in communication with the processor 115. The antenna 118 is in communication with both the receiver 116 and the transmitter 117 to facilitate the transmission and reception of wireless data.

Similarly, in addition to the components that may be found in a typical BS, the BS 120 includes a processor 125, a receiver 126, a transmitter 127, and an antenna 128. The processor 125 is configured to generate and transmit S-SCH symbols in accordance with the present invention. The receiver 126 and the transmitter 127 are in communication with the processor 125. The antenna 128 is in communication with both the receiver 126 and the transmitter 127 to facilitate the transmission and reception of wireless data.

Figure 5:
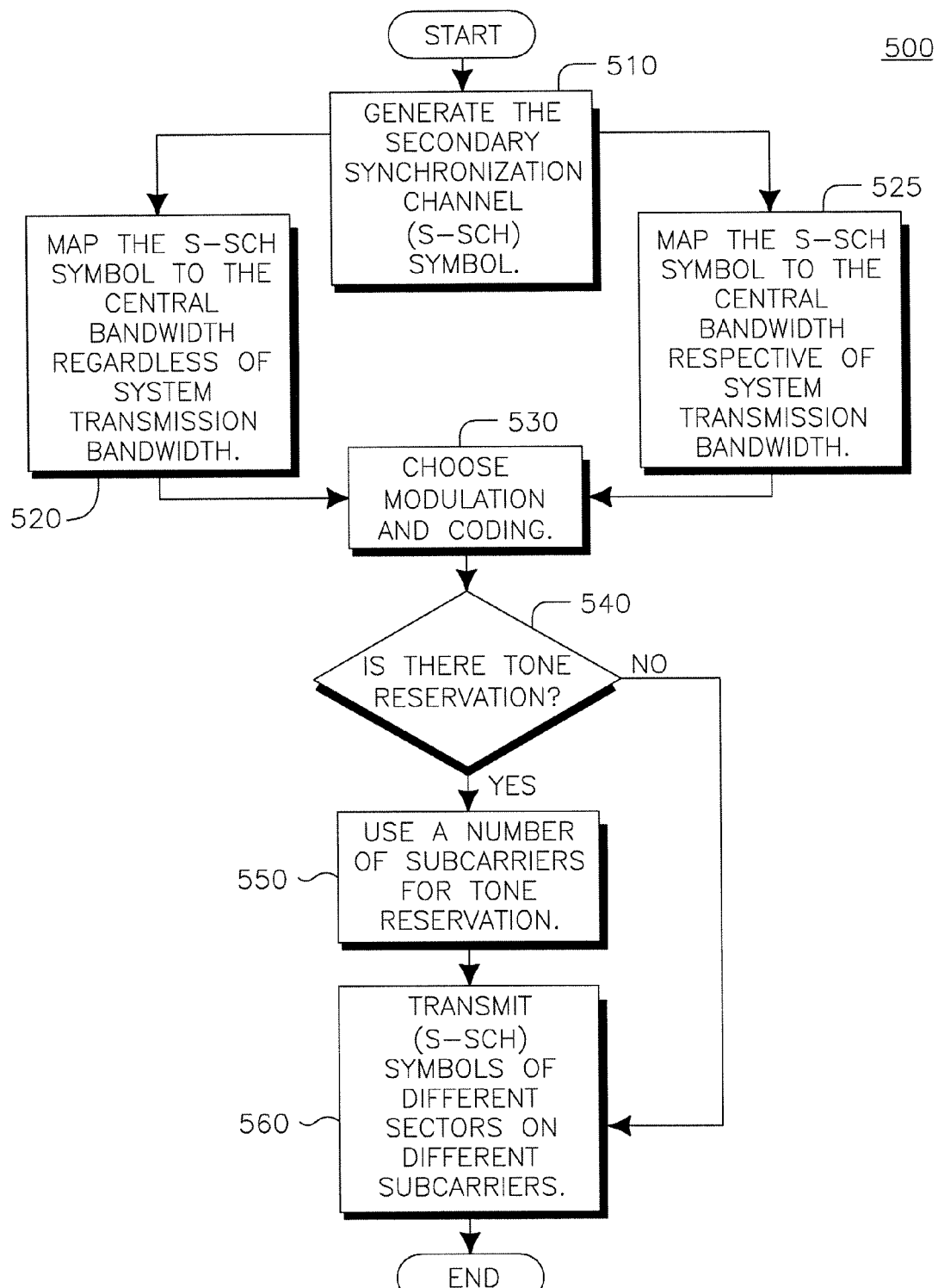
FIG. 5 is a flow diagram of a method for configuring secondary synchronization channels (S-SCHs) of neighboring sectors multiplexed in a frequency division multiplexing (FDM) manner, in accordance with the present invention.

FIG. 5 is a flow diagram 500 of a method for configuring S-SCHs that are multiplexed in an FDM manner in accordance with the present invention. In step 510, the S-SCH is generated to include cell-specific information.

The S-SCH symbols are then mapped to the central bandwidth, which may be performed in a number of ways. The S-SCH symbols may be mapped to the central bandwidth regardless of the system transmission bandwidth (step 520), or the S-SCH symbols may be mapped to the central bandwidth respective of the system transmission bandwidth (step 525)

For example, referring back to FIG. 1, the S-SCHs are mapped to the central 1.25 MHz bandwidth regardless of the transmission bandwidth of the system (step 520). In this case, the S-SCHs will utilize the same number of subcarriers for all possible system bandwidths. Additionally, since the number of subcarriers is limited by the 1.25 MHz bandwidth, the number of subcarriers utilized should be relatively low, for example no more than 76 subcarriers.

Appropriate modulation and coding is then chosen to fit the amount of coded bits on the subcarriers utilized by the S-SCH (step 530). In particular, binary phase shift keying (BPSK) or quadrature phase shift keying (QPSK) should be used for modulation, and repetition coding or Reed-Muller coding should be used to code the cell information bits. Table 1 below shows example parameters for an S-SCH in this case, where there is no tone reservation.

TABLE 1

| | Transmission BW | | | | | |
|---|---|---|---|---|---|---|
| | 1.25 MHz | 2.5 MHz | 5 MHz | 10 MHz | 15 MHz | 20 MHz |
| IFFT size (N) | 128 | 256 | 512 | 1024 | 1536 | 2048 |
| Number of available subcarriers | 76 | 151 | 301 | 601 | 901 | 1201 |
| Number of subcarriers that can be used for S-SCH | 75 | 75 | 75 | 75 | 75 | 75 |
| Subcarriers used by S-SCH of sector 1 | 1, 4, 7, ..., 73 | 1, 4, 7, ..., 73 | 1, 4, 7, ..., 73 | 1, 4, 7, ..., 73 | 1, 4, 7, ..., 73 | 1, 4, 7, ..., 73 |
| Subcarriers used by S-SCH of sector 2 | 2, 5, 8, ..., 74 | 1, 4, 7, ..., 74 | 2, 5, 8, ..., 74 | 2, 5, 8, ..., 74 | 2, 5, 8, ..., 74 | 2, 5, 8, ..., 74 |
| Subcarriers used by S-SCH of sector 3 | 3, 6, 9, ..., 75 | 1, 4, 7, ..., 75 | 3, 6, 9, ..., 75 | 3, 6, 9, ..., 75 | 3, 6, 9, ..., 75 | 3, 6, 9, ..., 75 |

If tone reservation is required (step 540), the same number of subcarriers should also be utilized for tone reservation for all possible system bandwidths (step 550). For example, 6 subcarriers may be used for tone reservation and 69 subcarriers used to transmit the S-SCH information. In this example, each sector uses 23 subcarriers to transmit its respective S-SCH information. Table 2 below shows example parameters for an S-SCH in this case, where there is tone reservation.

TABLE 2

| | Transmission BW | | | | | |
|---|---|---|---|---|---|---|
| | 1.25 MHz | 2.5 MHz | 5 MHz | 10 MHz | 15 MHz | 20 MHz |
| IFFT size (N) | 128 | 256 | 512 | 1024 | 1536 | 2048 |
| Number of available subcarriers | 76 | 151 | 301 | 601 | 901 | 1201 |
| Number of subcarriers that can be used for S-SCH | 75 | 75 | 75 | 75 | 75 | 75 |
| Subcarriers used for tone reservation | 1, 2, 3, 4, 5, 6 | 1, 2, 3, 4, 5, 6 | 1, 2, 3, 4, 5, 6 | 1, 2, 3, 4, 5, 6 | 1, 2, 3, 4, 5, 6 | 1, 2, 3, 4, 5, 6 |

TABLE 2-continued

| | Transmission BW | | | | | |
|---|---|---|---|---|---|---|
| | 1.25 MHz | 2.5 MHz | 5 MHz | 10 MHz | 15 MHz | 20 MHz |
| Subcarriers used by S-SCH of sector 1 | 7, 10, . . . , 73 | 7, 10, . . . , 73 | 7, 10, . . . , 73 | 7, 10, . . . , 73 | 7, 10, . . . , 73 | 7, 10, . . . , 73 |
| Subcarriers used by S-SCH of sector 2 | 8, 11, . . . , 74 | 8, 11, . . . , 74 | 8, 11, . . . , 74 | 8, 11, . . . , 74 | 8, 11, . . . , 74 | 8, 11, . . . , 74 |
| Subcarriers used by S-SCH of sector 3 | 9, 12, . . . , 75 | 9, 12, . . . , 75 | 9, 12, . . . , 75 | 9, 12, . . . , 75 | 9, 12, . . . , 75 | 9, 12, . . . , 75 |

In step 560, S-SCHs of different sectors are transmitted on different subcarriers. In this manner, collisions of S-SCHs may be avoided. In addition, equal-distant subcarriers may be used for the S-SCH per sector, and the distance should be equal to the number of sectors. For example, a distance of three subcarriers would be used for a cell site having three sectors.

In another example, referring back to FIG. 2, the S-SCH is mapped to the central 1.25 MHz and 5 MHz transmission bandwidths, respectively (step 525). In this example, the S-SCH utilizes the different number of subcarriers correspondingly.

Appropriate modulation and coding is then chosen to fit the amount of coded bits utilized by the S-SCH (step 530). In the present example, since there are more subcarriers for the S-SCHs in the system with bandwidths no less than 5 MHz, more conservative coding and modulation schemes may be utilized. For example, cyclic redundancy check (CRC) or convolutional coding may be used as compared to a system having a bandwidth lower than 5 MHz.

Table 3 below shows example parameters for an S-SCH in this case, where there is no tone reservation.

TABLE 3

| | Transmission BW | | | | | |
|---|---|---|---|---|---|---|
| | 1.25 MHz | 2.5 MHz | 5 MHz | 10 MHz | 15 MHz | 20 MHz |
| IFFT size (N) | 128 | 256 | 512 | 1024 | 1536 | 2048 |
| Number of available subcarriers | 76 | 151 | 301 | 601 | 901 | 1201 |
| Number of subcarriers that can be used for S-SCH | 75 | 75 | 300 | 300 | 300 | 300 |
| Subcarriers used by S-SCH of sector 1 | 1, 4, 7, . . . , 73 | 1, 4, 7, . . . , 73 | 1, 4, 7, . . . , 298 | 1, 4, 7, . . . , 298 | 1, 4, 7, . . . , 298 | 1, 4, 7, . . . , 298 |
| Subcarriers used by S-SCH of sector 2 | 2, 5, 8, . . . , 74 | 1, 4, 7, . . . , 74 | 2, 5, 8, . . . , 299 | 2, 5, 8, . . . , 299 | 2, 5, 8, . . . , 299 | 2, 5, 8, . . . , 299 |
| Subcarriers used by S-SCH of sector 3 | 3, 6, 9, . . . , 75 | 1, 4, 7, . . . , 75 | 3, 6, 9, . . . , 300 | 3, 6, 9, . . . , 300 | 3, 6, 9, . . . , 300 | 3, 6, 9, . . . , 300 |

If tone reservation is required (step 540), a number of subcarriers should also be utilized for tone reservation (step 550). For example, for S-SCHs utilizing 5 MHz, 24 subcarriers may be used for tone reservation and 276 subcarriers used to transmit the S-SCH information. In this example, each sector uses 92 subcarriers to transmit its respective S-SCH information. Table 4 below shows example parameters for an S-SCH in this case, where there is tone reservation.

TABLE 4

| | Transmission BW | | | | | |
|---|---|---|---|---|---|---|
| | 1.25 MHz | 2.5 MHz | 5 MHz | 10 MHz | 15 MHz | 20 MHz |
| IFFT size (N) | 128 | 256 | 512 | 1024 | 1536 | 2048 |
| Number of available subcarriers | 76 | 151 | 301 | 601 | 901 | 1201 |
| Number of subcarriers that can be used for S-SCH | 75 | 75 | 300 | 300 | 300 | 300 |
| Subcarriers used for tone reservation | 1, 2, 3, 4, 5, 6 | 1, 2, 3, 4, 5, 6 | 1, 2, . . . , 24 | 1, 2, . . . , 24 | 1, 2, . . . , 24 | 1, 2, . . . , 24 |
| Subcarriers used by S-SCH of sector 1 | 7, 10, . . . , 73 | 7, 10, . . . , 73 | 25, 28, . . . , 298 | 25, 28, . . . , 298 | 25, 28, . . . , 298 | 25, 28, . . . , 298 |
| Subcarriers used by S-SCH of sector 2 | 8, 11, . . . , 74 | 8, 11, . . . , 74 | 26, 29, . . . , 299 | 26, 29, . . . , 299 | 26, 29, . . . , 299 | 26, 29, . . . , 299 |
| Subcarriers used by S-SCH of sector 3 | 9, 12, . . . , 75 | 9, 12, . . . , 75 | 27, 30, . . . , 300 | 27, 30, . . . , 300 | 27, 30, . . . , 300 | 27, 30, . . . , 300 |

Regardless of any of the methods used above, if the number of subcarriers utilized by the S-SCH is less than the number of available subcarriers, the subcarriers not utilized by the S-SCH may be used for other purposes. For example, the unused subcarriers may contain other data or alternatively may be set to zero.

It should be noted that in tables 1, 2, 3, and 4 above, the subcarriers shown are exemplary. Other numerical subcarriers may be utilized in place of, or in addition to, the subcarriers described in the above tables.

Figure 6:
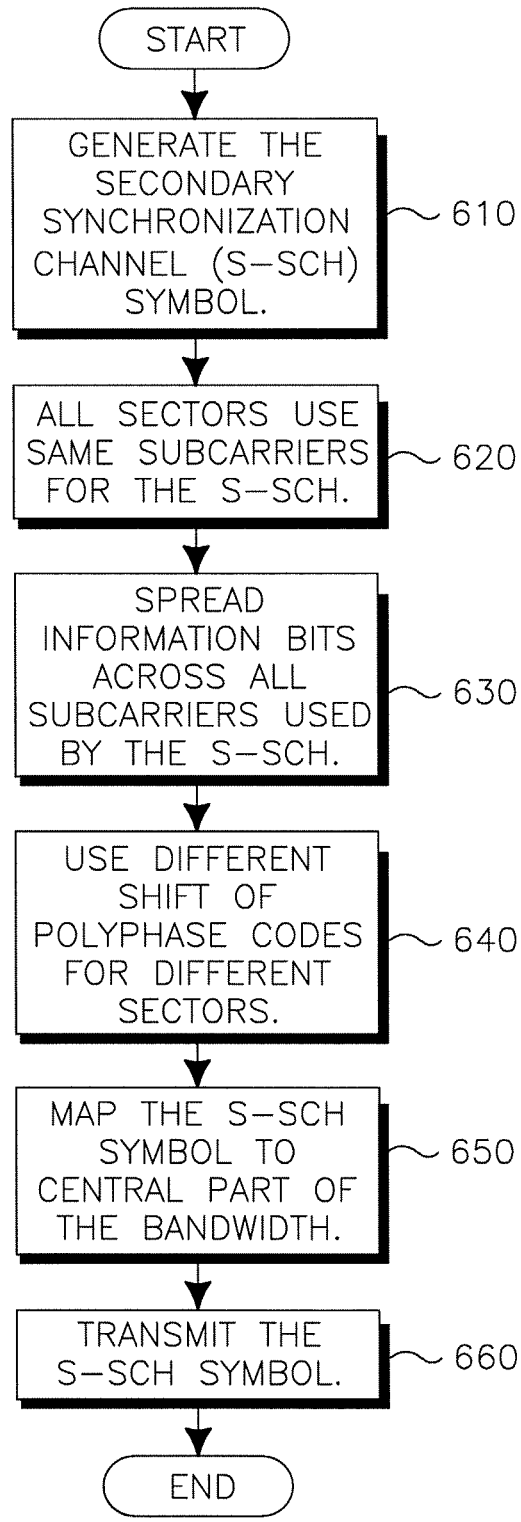
FIG. 6 is a flow diagram of a method for configuring S-SCHs of neighboring sectors multiplexed in a code division multiplexing (CDM) manner, in accordance with the present invention.

FIG. 6 is a flow diagram of a method 600 for configuring S-SCHs multiplexed in a code division multiplexing (CDM) manner, in accordance with another embodiment of the present invention. The S-SCH symbol is generated in step 610. In the CDM case, all sectors utilize the same subcarriers for the S-SCH (step 620). In addition, information bits are mapped across all subcarriers used by the S-SCH (step 630).

In order to reduce the PAPR of the S-SCH, polyphase codes or constant amplitude zero auto-correlation (CAZAC) codes should be used for spreading, and different sectors should use a different shift of polyphase codes to be orthogonal to one another (step 640). Among polyphase codes, GCL or Zadoff-Chu codes may be utilized.

For a particular length of $N_c$, a generic polyphase code sequence may be determined in accordance with the following equation:

$$G_k = e^{-jk^2 \frac{\pi}{N_c}}, k = 0, 1, \ldots, N_c - 1. \quad \text{Equation (1)}$$

Additionally, more orthogonal polyphase code sequences may be created by shifting the generic orthogonal polyphase sequence in phase. Accordingly, the lth shifted version of generic orthogonal polyphase sequence may be determined in accordance with the following equation:

$$G_k^{(l)} = e^{-jk^2 \frac{\pi}{N_c}} \cdot e^{-jkl \frac{2\pi}{N_c}}, k = 0, 1, \ldots, N_c - 1, l = 0, 1, \ldots, N_c - 1. \quad \text{Equation (2)}$$

Two polyphase code sequences with different shifts are substantially orthogonal to each other.

In step 650, the S-SCH symbol is mapped to the central part of the bandwidth. Additionally, subcarriers not used by the S-SCH may be utilized to contain other data or be set to a value of "zero." In step 660, the S-SCH is transmitted to WTRUs in the system.

In one example of the CDM method (600), when choosing $N_c$ equal to 64, 64 subcarriers would be used for the S-SCH. This would apply to a cell having a bandwidth less than 5 MHz only, such as shown in FIG. 2, or for an S-SCH in a cell such as shown in FIG. 1. If a spreading factor of 4 is used, then 16 symbols may be transmitted on the S-SCH. If a spreading factor 8 is used, then 8 symbols may be transmitted on the S-SCH.

Again, depending on the number of bits contained in the S-SCH, appropriate modulation and coding is chosen to fit the amount of coded bits on the subcarriers used by the S-SCH. BPSK or QPSK should be used for modulation. Repetition coding or Reed-Muller coding may be used if a small amount of uncoded bits are contained on the S-SCH.

In another example of the CDM method (600), when choosing $N_c$ equal to 256, 256 subcarriers would be used for the S-SCH. This also applies to a cell having a bandwidth less than 5 MHz only, such as shown in FIG. 2, or for an S-SCH in a cell such as shown in FIG. 1. If a spreading factor of 8 is used, then 32 symbols may be transmitted on the S-SCH. Likewise, if a spreading factor of 16 is used, then 16 symbols may be transmitted on the S-SCH. However, if a spreading factor of 32 is used, then 8 symbols may be transmitted on the S-SCH. Since more symbols may be transmitted in these schemes, more conservative coding (such as convolutional coding) and modulation schemes may be used compared to a system with a bandwidth lower than 5 MHz.

Several frame formats may be utilized, but in general, both a P-SCH symbol and an S-SCH symbol should be transmitted one or more times during a single radio frame having a typical length of 10 milliseconds (ms). The number of transmitted P-SCH symbols and S-SCH symbols need not be the same. However, the S-SCH symbols should be transmitted after the P-SCH symbols.

Figure 7:
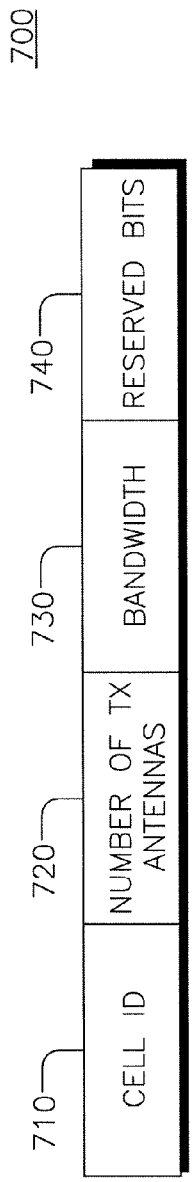
FIG. 7 is an exemplary information field of an S-SCH, in accordance with the present invention.

FIG. 7 is an exemplary information field 700 of an S-SCH, in accordance with the present invention. Referring now to FIG. 7, the information field 700 includes a cell ID field 710, a number of transmit (TX) antennas field 720, a bandwidth field 730, and a reserved bits field 740. It should be noted that any combination of these fields may be present, and that other fields not shown may also be included in the information field 700. The number of TX antennas field 720 typically includes information relating to the number of TX antennas at a Node-B in the system. The bandwidth field 730 includes information relating to the bandwidth of the cell.

Figure 8:
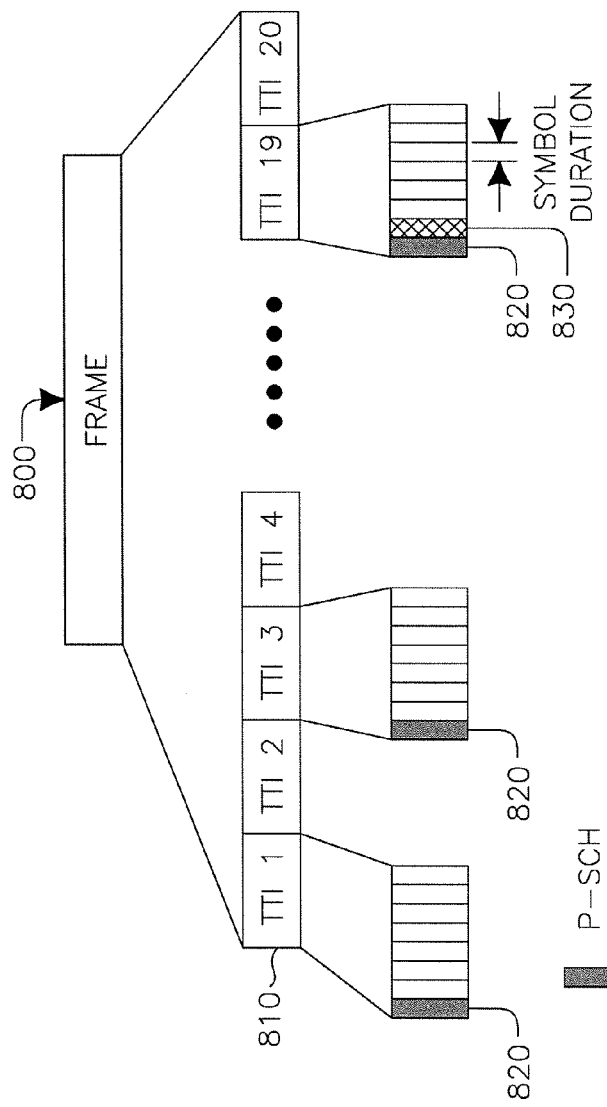
FIG. 8 is an exemplary diagram of a frame format with equal intervals between primary SCH (P-SCH) symbols, in accordance with the present invention.

FIG. 8 is an exemplary diagram of a frame format 800 with equal intervals between P-SCH symbols, in accordance with the present invention. The frame format 800 includes a plurality of transmission time intervals (TTIs) 810 (designated as TTI 1, TTI 2, . . . , TTI 20). Each TTI 810 includes a plurality of OFDM symbols having a particular symbol duration. As shown in FIG. 8, the first symbol of each odd numbered TTI 810, (e.g., TTI 1, TTI 3, . . . , TTI 19), includes a P-SCH 820, such that equal intervals exist between P-SCH symbols. An S-SCH 830 is included in TTI 19 following the P-SCH 820. It should be noted that, although the S-SCH 830 is depicted as immediately following the P-SCH 820 in TTI 19, the S-SCH 830 could be transmitted at other time locations relative to the P-SCH 820.

Figure 9:
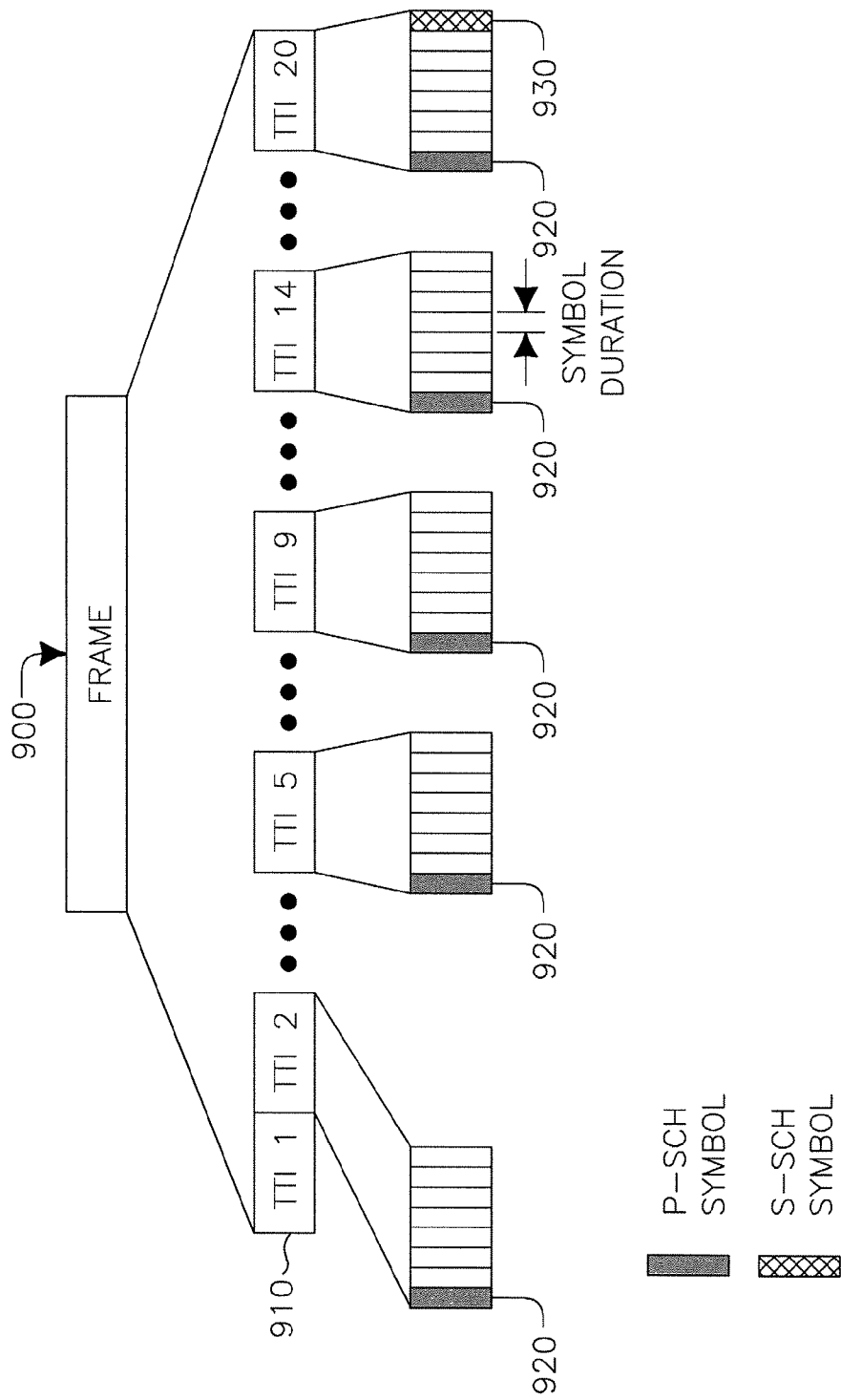
FIG. 9 is an exemplary diagram of a frame format with unequal intervals between P-SCH symbols, in accordance with the present invention.

FIG. 9 is an exemplary diagram of a frame format 900 with unequal intervals between P-SCH symbols, in accordance with the present invention. The frame format 900 includes a plurality of transmission time intervals (TTIs) 910 (designated as TTI 1, TTI 2, . . . , TTI 20). Each TTI 910 includes a plurality of OFDM symbols having a particular symbol duration. As shown in FIG. 9, a P-SCH symbol 920 is placed in the first symbol of particular TTIs 910, (e.g., TTI 2, TTI 5, TTI 9, TTI 14, and TTI 20). As shown in FIG. 9 unequal intervals exist between P-SCH symbols. An S-SCH symbol 930 is placed in TTI 20 following the P-SCH 920 and at the end of TTI 20. Likewise, a P-SCH symbol can be placed in the last OFDM symbol of a TTI, and an S-SCH symbol may be placed in the OFDM symbol before the P-SCH symbol. It should be noted that, although the S-SCH 930 is depicted as following the P-SCH 920 in TTI 20 at the end of the TTI, the S-SCH 930 could be transmitted at other time locations relative to the P-SCH 920.

The processors 125 of the BS 120 may be configured to perform the steps of the methods 500 and 600 described above. The processors 115/125 may also utilize the receivers 116/126, transmitters 117/127, and antennas 118/128, respectively, to facilitate wirelessly receiving and transmitting data.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
    circuitry configured to receive at least a first primary synchronization signal out of a plurality of primary synchronization signals; wherein each primary synchronization signal is received in an orthogonal frequency division multiple access (OFDMA) symbol within a transmission time interval; wherein the primary synchronization signals are received over a fixed number of subcarriers at a center of a system bandwidth; wherein the circuitry is further configured to receive the at least one first primary synchronization signal over the fixed number of subcarriers at a center of a transmission bandwidth for any of a plurality of different system bandwidths; and
    the circuitry is further configured, based on a received timing of the at least first primary synchronization signal, to receive system information in at least one OFDM symbol next in time to the OFDM symbol of a second primary synchronization signal out of the plurality of primary synchronization signals; wherein the received system information is received in the fixed number of subcarriers at the center of the system bandwidth; wherein the system information includes an indication of the system bandwidth and an indication of a number of transmission antennas of a base station, wherein the circuitry is further configured to process received data based on the number of transmission antennas of the base station.

2. The WTRU of claim 1 wherein the fixed number of subcarriers is 76 or less.

3. The WTRU of claim 1 wherein the symbol of the second primary synchronization signal and the at least one OFDM symbol next in time are within a same transmission time interval (TTI).

4. The WTRU of claim 1 wherein the system information is convolutionally coded and is received in a quadrature phase shift keying (QPSK) signal.

5. The WTRU of claim 1 wherein the system information is transmitted with a cyclic redundancy check (CRC) and is received in a quadrature phase shift keying (QPSK) signal.

6. The WTRU of claim 1 wherein the circuitry is further configured to receive a secondary synchronization signal in the fixed number of subcarriers.

7. The WTRU of claim 6 wherein the secondary synchronization signal provides information for cell ID.

8. The WTRU of claim 6 wherein at least one of the primary synchronization signal or the secondary synchronization signal is derived from a constant amplitude zero autocorrelation sequence.

9. The WTRU of claim 1 wherein the primary synchronization signals are transmitted a plurality of times in a frame and the system information is transmitted at most only once in the frame.

10. The WTRU of claim 9 wherein the system information is transmitted periodically.

11. A method implemented in a wireless transmit/receive unit (WTRU), the method comprising:
receiving at least a first primary synchronization signal out of a plurality of primary synchronization signals; wherein each primary synchronization signal is received in an orthogonal frequency division multiple access (OFDMA) symbol within a transmission time interval; wherein the primary synchronization signals are received over a fixed number of subcarriers at a center of a system bandwidth; wherein the at least one first primary synchronization signal is received over the fixed number of subcarriers at a center of a transmission bandwidth for any of a plurality of different system bandwidths;
based on a received timing of the at least first primary synchronization signal, receiving system information in at least one OFDM symbol next in time to the OFDM symbol of a second primary synchronization signal out of the plurality of primary synchronization signals; wherein the received system information is received in the fixed number of subcarriers at the center of the system bandwidth; wherein the system information includes an indication of the system bandwidth and an indication of a number of transmission antennas of a base station; and
processing received data based on the number of transmission antennas of the base station.

12. The method of claim 11 wherein the fixed number of subcarriers is 76 or less.

13. The method of claim 11 wherein the symbol of the second primary synchronization signal and the at least one OFDM symbol next in time are within a same transmission time interval (TTI).

14. The method of claim 11 wherein the system information is convolutionally coded and is received in a quadrature phase shift keying (QPSK) signal.

15. The method of claim 11 wherein the system information is transmitted with a cyclic redundancy check (CRC) and is received in a quadrature phase shift keying (QPSK) signal.

16. The method of claim 11 further comprising receiving a secondary synchronization signal in the fixed number of subcarriers.

17. The method of claim 16 wherein the secondary synchronization signal provides information for cell ID.

18. The method of claim 16 wherein at least one of the primary synchronization signal or the secondary synchronization signal is derived from a constant amplitude zero auto-correlation sequence.

19. The method of claim 11 wherein the primary synchronization signals are transmitted a plurality of times in a frame and the system information is transmitted at most only once in the frame.

20. The method of claim 19 wherein the system information is transmitted periodically.

* * * * *